United States Patent
Paul et al.

(10) Patent No.: US 8,884,930 B2
(45) Date of Patent: Nov. 11, 2014

(54) GRAPHICAL DISPLAY WITH OPTICAL PEN INPUT

(75) Inventors: Binush Kumar Paul, Kitchener (CA); Paul Robin Keip, Kitchener (CA)

(73) Assignee: BlackBerry Limited, Waterloo Ontario (CA)

( * ) Notice: Subject to any disclaimer, the term of this patent is extended or adjusted under 35 U.S.C. 154(b) by 134 days.

(21) Appl. No.: 13/486,330

(22) Filed: Jun. 1, 2012

(65) Prior Publication Data

US 2013/0321351 A1    Dec. 5, 2013

(51) Int. Cl.
G06F 3/033 (2013.01)
G06F 3/03 (2006.01)
G06F 3/042 (2006.01)

(52) U.S. Cl.
CPC ............ G06F 3/0317 (2013.01); G06F 3/0321 (2013.01); G06F 3/042 (2013.01)
USPC ............ 345/179; 345/173; 345/174; 345/175

(58) Field of Classification Search
CPC .................................................. G06F 3/03545
USPC ................................................. 345/179, 175
See application file for complete search history.

(56) References Cited

U.S. PATENT DOCUMENTS

| | | | |
|---|---|---|---|
| 5,402,151 A * | 3/1995 | Duwaer | 345/173 |
| 5,852,434 A * | 12/1998 | Sekendur | 345/179 |
| 6,326,956 B1 | 12/2001 | Jaeger et al. | |
| 7,175,095 B2 | 2/2007 | Pettersson et al. | |
| 2003/0034961 A1* | 2/2003 | Kao | 345/179 |
| 2005/0162400 A1 | 7/2005 | Tseng et al. | |
| 2006/0139338 A1 | 6/2006 | Robrecht et al. | |
| 2006/0250381 A1 | 11/2006 | Geaghan | |
| 2007/0285405 A1 | 12/2007 | Rehm | |
| 2009/0207101 A1* | 8/2009 | Noguchi et al. | 345/55 |
| 2010/0053080 A1* | 3/2010 | Shieh | 345/157 |
| 2010/0141785 A1 | 6/2010 | Kim et al. | |
| 2011/0102379 A1 | 5/2011 | Lapstun et al. | |
| 2011/0162894 A1 | 7/2011 | Weber | |
| 2012/0127110 A1* | 5/2012 | Amm et al. | 345/174 |

OTHER PUBLICATIONS

EESR dated Nov. 6, 2012 for EP 12170514.

* cited by examiner

*Primary Examiner* — Dorothy Harris
(74) *Attorney, Agent, or Firm* — Jeffrey N. Giunta; Fleit Gibbons Gutman Bongini & Bianco PL

(57) ABSTRACT

Methods and apparatuses of obtaining user input. A display of an optical tracking grid is initiated on an electronic graphical display. Changes are determined among images of at least a portion of the optical tracking grid that are captured by a tracking pen device. Based on the determined changes in the images, a movement of a portion of the tracking pen device is determined. A data set characterizing movement is produced in response to determining the movement.

24 Claims, 7 Drawing Sheets

GRAPHICAL DISPLAY WITH OPTICAL PEN INPUT

FIELD OF THE DISCLOSURE

The present disclosure generally relates to electronic device user interface input devices, and more particularly to pen based user input devices.

BACKGROUND

Electronic devices use various methods to allow users to provide information to the device and to receive information from the device. Examples of techniques used to provide user input to an electronic device include pressing keys, manipulating a mouse or other tracing input device, using a touch screen with a finger or mechanical stylus, or combinations of these. In certain scenarios, users are more comfortable using convenient and familiar handwriting input techniques to provide input to an electronic device.

Various techniques are used to allow a user to input data into a computer by using handwritten drawings. In one example, touch sensors or other contact location sensors, such a sensors that detect an object in the tip of the stylus, are incorporated into a display screen and the motion of the stylus is tracked by the sensors to determine the movement of the stylus tip. These examples require specialized sensors to be used in the display of screen of the electronic device. These sensors are often susceptible to detecting unintended contact with the display screen, such as when the user rests his or her palm on the display screen when writing thereon. Detecting unintended contact with the display screen occurs with both pressure sensing designs and capacitive touch screens.

Another example of providing handwritten input to electronic devices uses a pen-like device that has an optical sensor in its tip, and this pen-like device is used in conjunction with special paper that has a matrix of dots pre-printed thereon. The optical sensor in the tip of the pen-like device periodically captures images of the paper, and its pre-printed dots, when the pen is writing on the paper and by analyzing changes in the captured images, the motion of the tip of the pen-like device is determined. These motions are accumulated and communicated to an electronic device for further processing. These examples do not support use with conventional electronic graphical displays and are limited to writing images on paper. Writing on paper does not allow a processor to alter or augment the written image as the user is writing. Similar pen-like devices include gyroscopic determination of pen movement instead of optical tracking of surface features. These examples require a more complex design that includes gyroscopic tracking and processing to determine pen movement.

The usability of electronic devices can be improved by providing cost effective designs to allow handwritten user input on a display that can be altered by a processor.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
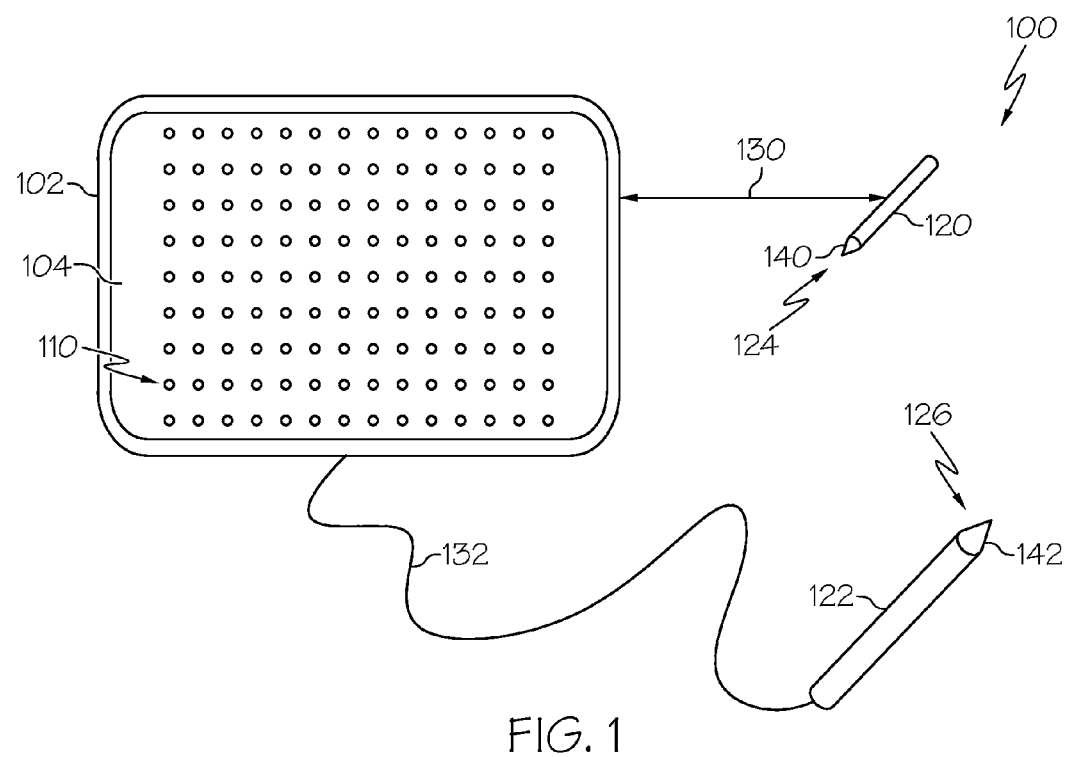
FIG. 1 illustrates a touch screen based computing device with pen input, in accordance with one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term "among," which may be used to indicate "with respect to" two or more things, may include the concept of "between" two things. The term "another," as used herein, is defined as at least a second or more. The terms "including" and "having," as used herein, are defined as comprising (i.e., open language). The term "coupled," as used herein, is defined as "connected," although not necessarily directly, and not necessarily mechanically or electrically, according to context. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Described below are apparatuses and methods that provide a cost effective solution to support handwritten input by a user into an electronic device. A pen-like device is provided that has an optical pattern tracking component that tracks the movement of the pen-like device over a surface (that is, the movement of the device with respect to the surface). In one example, the optical pattern tracking component captures a sequence of images on a surface that is beneath the tip of the pen-like device and determines movement of the tip of the pen-like device along that surface. The pen-like device of one example is used to draw on an electronic graphical display that is configured to display a grid of dots or other symbols to better support the optical tracking performed by the optical pattern tracking component of the pen-like device. Capturing refers to any form of representing, or obtaining a representation of, anything that can be sensed optically, and may include recording or storing an image or part of an image, detecting the presence or a feature of the appearance of an object (such as color or brightness), or deriving a machine-readable representation or definition of something optically sensed. As described below, capturing can map something observable optically into a representation that can be interpreted, evaluated, manipulated or otherwise analyzed by a processor.

In one example, the pen-like device is able to be used with any type of electronic graphical display that is able to display the grid of dots or other symbols whose images are captured by the pen-like device. For example, a computer or other electronic device is able to be provided with driver software to cause the graphical display of the device to present the grid of dots or other symbols, and receive data from the pen-like device as drawing input that is similar to data describing the movement of a computer mouse. Such a configuration is able to be used to replace or to augment other input devices, such as touch screens, mouse devices, keypads, and the like.

The pen-like device is able to communicate its determined movements to the electronic device by a wired or wireless data link. Movements may be determined with respect to any reference, such as the center of the Earth or the surface of the electronic graphical display. For purpose of illustration, movements of a tracking pen or a stylus tip or the like may be considered to be with respect to a surface of the graphical display. In one example, determined movements are provided to the electronic device as the user is writing on the electronic graphical display of that device. These determined movements are able to be used to provide feedback to the user, such as by drawing a line of the electronic graphical display that corresponds to the path traced by the tip of the pen-like device. In one example, the determined movements of the pen-like device are communicated to the electronic device substantially simultaneously with the movement of the pen-like device. As used herein, substantially simultaneously describes a timing relationship between two acts, such as moving the pen-like device and communicating the determined movements to the electronic device, such that the two acts appear to a human user as occurring without a time interval between them.

In one example, the pen-like device identifies when it is being used as an input device and disables one or more other input mechanisms of the electronic input device to which it is providing input. For example, when using the pen-like device as an input device by writing on a touch screen display, the pen-like device is able to send a signal to the electronic device that causes the touch screen input mechanism to be disabled. Disabling the touch screen input mechanism when the user is writing on the touch screen surface with a pen-like device precludes the touch screen input mechanism from reacting to unintended contacts, such as by the user's palm resting on the touch screen while writing with the pen-like device. The pen-like device is able to use various criteria to identify when it is being used as an input device. For example, simply turning on the pen-like device, or operating a switch on the pen-like device by sliding or simply gripping the pen-like device, is able to identify use and cause the touch screen input to be disabled. Other criteria used to identify use of the pen-like device include detecting pressure on the tip of the pen like device or determining that the optical pattern tracking component has detected a portion of an optical tracking grid. In various examples, when the touch screen input mechanism is not disabled, a user is able to use the touch screen input mechanism as a user input device by touching the screen in a conventional manner, such as with a finger or other object, including the pen-like device.

The example systems and methods described herein provide an efficient and cost effective user input functionality with broad applicability and many benefits. The use of a pen-line device allows a user to enter data by familiar writing techniques. The described examples use display functionality already present in a device to display optical tracking data that is utilized to track the movement of the pen-like device. These examples provide great flexibility to a user by allowing the free-form entry of input that is able to take the form of drawings or handwritten characters. A user is able to freely enter characters and drawings without changing modes or other disruptions in the use of the input device.

The examples described herein are able to be adapted for incorporation into a variety of devices, including a variety of pen-like devices and electronic displays. These examples are able to use any pen-like device, including user input devices shaped like actual pens, devices that are able to be attached to a user's fingers, devices used by persons with physical handicaps or other impairments that may impede the use of other touch input techniques. These examples are able to be applied to a variety of devices with electronic graphical displays such as small electronic devices with small displays that allow a user to enter gestures or write commands, electronic devices with larger electronic displays that are used to enter various amounts of text, drawings, or other written input, larger devices, such as appliances, machinery, and so forth, that receive user input to control operation of the device or to enter data to be processed by the device, communicated to other devices, used in other ways, or any combination of these.

The input systems and method described herein are further able to be applied or adapted to a variety of applications such as for use with free form drawing applications, entry of handwritten text into word processing applications. These systems and methods further provide cost effective input techniques that are able to be used in, for example, media management application such as organizing data files or initiating actions to be performed on those data files, playing or otherwise controlling games, or any other application or system.

The examples described herein are further able to provide user input system and methods that have improved aesthetics and that allow more precise entry of graphical information, such as free form drawings, tracing of objects, entry of data onto forms, or the more precise entry of positional or tracing data onto an electronic display. The use of optical tracking of displayed tracking grids further provides improves robustness and reliability of the devices, such as in comparison to touch screen or other interfaces with delicate physical sensors that are susceptible to damage by, for example, contact with sharp objects. In some examples, the systems and methods described herein allow a user to enter data on a touchscreen display by using a pen-like device, wherein the pen-like device disables the touch sensitive input of the touchscreen display in response to determining that the user is using the pen like device. Such features improves the usability of handwritten input by ignoring false inputs caused by, for example, a user's palm resting on the touchscreen display while writing with the pen-like device. The exclusion of touch based inputs through the touchscreen display while using the optical tracking techniques described herein reduces the occurrence of input errors, and correspondingly reduces the associated corrective actions required to be taken by the user as a result of those erroneous inputs, in the case of unintended contacts.

The use of a pen-like device increases user convenience, improves the capacity for naturalness of user interaction due to, for example, the similarity of the user experience in using a pen-like device is a lot more like actual writing or drawing, especially in comparison to conventional stylus-screen experiences. The use of a separate pen-like device and the use of a potentially existing electronic graphical display to display the optical tracking grid that is used by that pen-like device improves ease of manufacture and reduces manufacturing costs and complexity relative to devices with separate optical tracking grid components. The examples described herein allow additional user input functionality, by using a pen-like device, in devices of various sizes, shapes, and applications, with little or no change in the size or weight of those devices. Not adding size or weight to the device is particularly important in, for example, incorporating these examples into handheld devices.

FIG. 1 illustrates a touch screen based computing device with pen input 100, in accordance with one example. The touch screen based computing device with pen input 100 includes a portable electronic device 102 that has a display body (which forms the case for the portable electronic device 102) and a display screen 104. In various examples, the display screen 104 is an electronic graphical display that has a touch sensitive screen input able to support touch sensing and thereby operate as a touch screen input device. In further examples, the display screen 104 is an electronic graphical display that does not include any type of input sensing ability, but simply displays graphical data to a user. Examples of electronic graphical displays include physical graphical displays that allow individual pixels of the display to be turned on and off. In various examples, the pixels are able to be turned on to display monochrome or configurable color data. Electronic graphical displays are able to be based on, for example Liquid Crystal Display (LCD) hardware, Organic Light Emitting Diode (OLED) hardware, or any other graphical display technology.

The display screen 104 is depicted as an electronic graphical display that is mounted within the display body of the portable electronic device 102. Electronic graphical displays of various examples are able to be physically coupled to the display body of any type of device. For example, an electronic graphical display is able to be mounted on an exterior portion of a display body. Electronic devices are able to use any other type of physical couplings between the display body and one or more electronic graphical display.

The touch screen based computing device with pen input 100 further depicts two tracking pen devices, a wireless tracking pen device 120 and a wired tracking pen device 122. Each of the two tracking pen devices includes a pen tip, a first pen tip 124 and a second pen tip 126, respectively. These pen tips in one example each includes a surface optical tracking sensor that determines movement of the pen tip in which it is included. The wireless tracking pen device 120 has a first surface optical tracking sensor 140 located in its first pen tip 124. The wired tacking pen device 122 has a second surface optical tracking sensor 142 located in its second pen tip 126.

The optical tracking sensors of one example include an image capturing device, which captures a sequence of images of the surface below the pen tip, and an optical processor, that determines the movement of the pen tip in which it is included by analyzing successive images of a surface below the pen tip to determine changes in the successive images and thereby determine movement of image components. The movement of the image components corresponds to the inverse of movements of the pen tip. Tracking pen devices allow a user to hold the tracking pen device as one holds a conventional pencil or pen and "write" on a surface as though the user is writing on actual paper with a pen.

The display screen 104 in this example is displaying an optical tracking grid 110. The optical tracking grid in one example is an array of dots that are able to be detected and tracked by an optical tracking sensor within a pen tip of a tracking pen device. The optical tracking grid in various examples is able to consist of an arrangement of dots that are of a suitable color for detection by the optical tracking sensor. In various examples, the optical tracking grid is able to be presented as dots of any color, such as black or gray, or a color that is less easily discerned by a user looking at the display screen 104.

In order to determine the location of a pen tip of a tracking pen device when the pen is initially placed on a surface, and also when the pen is lifted and placed on another section of the surface as is frequently performed in natural writing, optical tracking grids are displayed on surfaces that are to be used with a tracking pen device. For example, a matrix of dot patterns are placed on a surface, which the matrix includes a number of encoded dot fields where each encoded dot field is a dot pattern in a unique combination that allows a processor receiving captured images of the dot patterns to identify the location of the encoded dot field on the optical tracking grid.

In one example, the pen tip of the tracking pen devices has a tip pressure sensor that senses when there is pressure on the pen tip due to, e.g., a user's pressing the pen tip down onto a writing surface. Detection of pressure being applied on the pen tip is able to be used to determine when to process a sequence of images to determine pen movement. When the tip pressure sensor does not sense pressure, the processing assumes that the user is not "writing" with the pen on a surface. When the tip pressure sensor senses pressure, the processing assumes that the user is "writing" and processes captured images to determine the movement of the pen and determine user input data.

In some examples, a sequence of images captured by the image capturing device of a tracking pen device is processed by an optical processor within the tracking pen device. In such examples, the optical processor within the tracking pen device determines changes among the sequence of captured images and determines movements of the tracking pen based thereon. The optical processor in some examples determines a data set that characterizes the movements of the tracking pen device and sends that data to the electronic device 102 or to any other electronic device that is able to accept the data set. In some examples, the optical processor within the tracking pen device determines and produces (e.g., collects, assembles, generates or otherwise brings about) a data set that characterizes movements of the tracking pen device as movement vectors that describe movements of the pen tip. The data set is also able to characterize pen tip movements as locations on the surface. In other examples, the optical processor within the tracking pen device processes the pen tip movement data and performs, for example, handwriting analysis to derive text characters that correspond to the pen tip movement. The optical processor is then able to convey textual data to the processor within the electronic device 102, either alone or along with the original movement data. Although there need not be any specific size of the data set or any specific arrangement of the data that characterizes pen tip movements, a typical data set may include two or more pieces of data that pertain to or are representative of movement.

In various examples, the data collected or produced by a processor within the tracking pen device is sent to a processor within the electronic device 102 or to any other processor over an available data link. In the case of the wireless tracking pen device 120, a wireless data link 130 is able to be used to convey the captured images. Examples of the wireless data link 130 include a wireless data link that conforms to a Bluetooth® standard, or a wireless data link that conforms to any other wireless data link standard or interface. In the case of the wired tracking pen device 122, a wired data link 132 is able to be used to convey the captured images. Examples of implementations of the wired data link 132 include data links that conform to a Universal Serial Bus (USB) standard, or to any suitable wired data exchange standard or interface.

Figure 2:
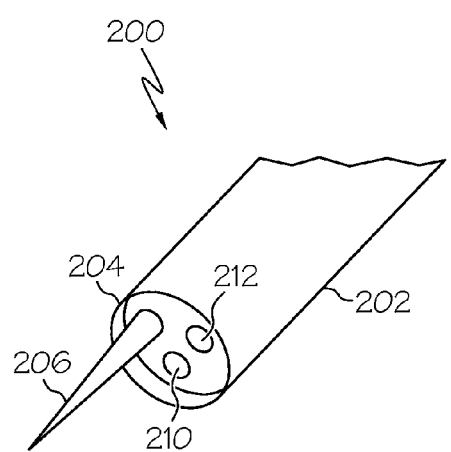
FIG. 2 illustrates a pen tip, according to one example.

FIG. 2 illustrates a pen tip 200, according to one example. The pen tip 200 is an example of the pen tips discussed above, such as the first pen tip 124 and the second pen tip 126, which are at the tip of the first tracking pen device 120 and the second tracking pen device 122. As discussed above, the pen tip 200 illustrates components that are part of a tracking pen device to sense when the tracking pen device is being pressed onto a surface and to capture images of the surface to determine movement of the tracking pen body.

The pen tip 200 illustrates a tracking pen body 202 that has a tip opening 204. Within the tip opening is mounted a tip pressure sensor 206, an image capturing device 210 and a light source 212. The tip pressure sensor 206 operates to determine when a user presses the tracking pen body 202 down onto a surface. In various examples, the tracking pen device is only active when the tip pressure sensor detects pressure being applied to the tip of the tracking pen body. In some examples, a detection of pressure being applied to the tip pressure sensor is communicated to a display device to control various functions therein.

The tip pressure sensor 206 in one example includes a spring loaded switch that engages when pressure is applied to a distal end of the tip pressure sensor. In one example, the spring loaded switch is located in the tip opening 204 near the point where the tip pressure sensor 206 physically connects to the tracking pen body 202.

The image capturing device 210 in one example is a small photographic camera that is optimized to capture images of a surface that is at the end of the tip pressure sensor 206. In operation, the image capturing device 210 is fixedly mounted to the tracking pen body 202 captures a sequence of images that are located in the vicinity of the end of the tip pressure sensor when the tip pressure sensor is in contact with a surface.

The light source 212 is located in the tip opening 204 and serves to illuminate the area in front of the tip opening 204, concentrating on the area located at the end of the tip pressure sensor 206. The light source 212 in various examples is able to operate alone or in conjunction with other illumination sources for the surface of which the image capturing device 210 is capturing images. In one example, a tracking device pen is able to be used with an electronic display that has a display backlight, such as a Liquid Crystal Display (LCD) or Organic Light Emitting Diode (OLED) based display. The image capturing device 210 is able to detect images illuminated by the light source 212, a display backlight of a display with which the tracking device pen is used, or both. In examples of tracking device pens that are used with displays having a backlight, the light source 212 is not needed and may be disable or not included in the tracking device pen. The image capturing device 210 of some examples senses light in different portions of the visible or non-visible spectrum. The light source 212 in one example emits light in the portion of the light spectrum that is sensed by the image capturing device 210.

In examples of tracking pen devices that are used with electronic graphical displays, such as the electronic graphical display screen 104 discussed above, the light source 212 is able to supplement or replace a backlight of the electronic graphical display screen 104. In such an example, the electronic graphical display screen 104 is able to act as a reflective display without a backlight, and the light source 212 operates to ensure that the surface of the electronic graphical display screen 104 reflects sufficient light to support proper operation of the image capturing device 210.

Figure 3:
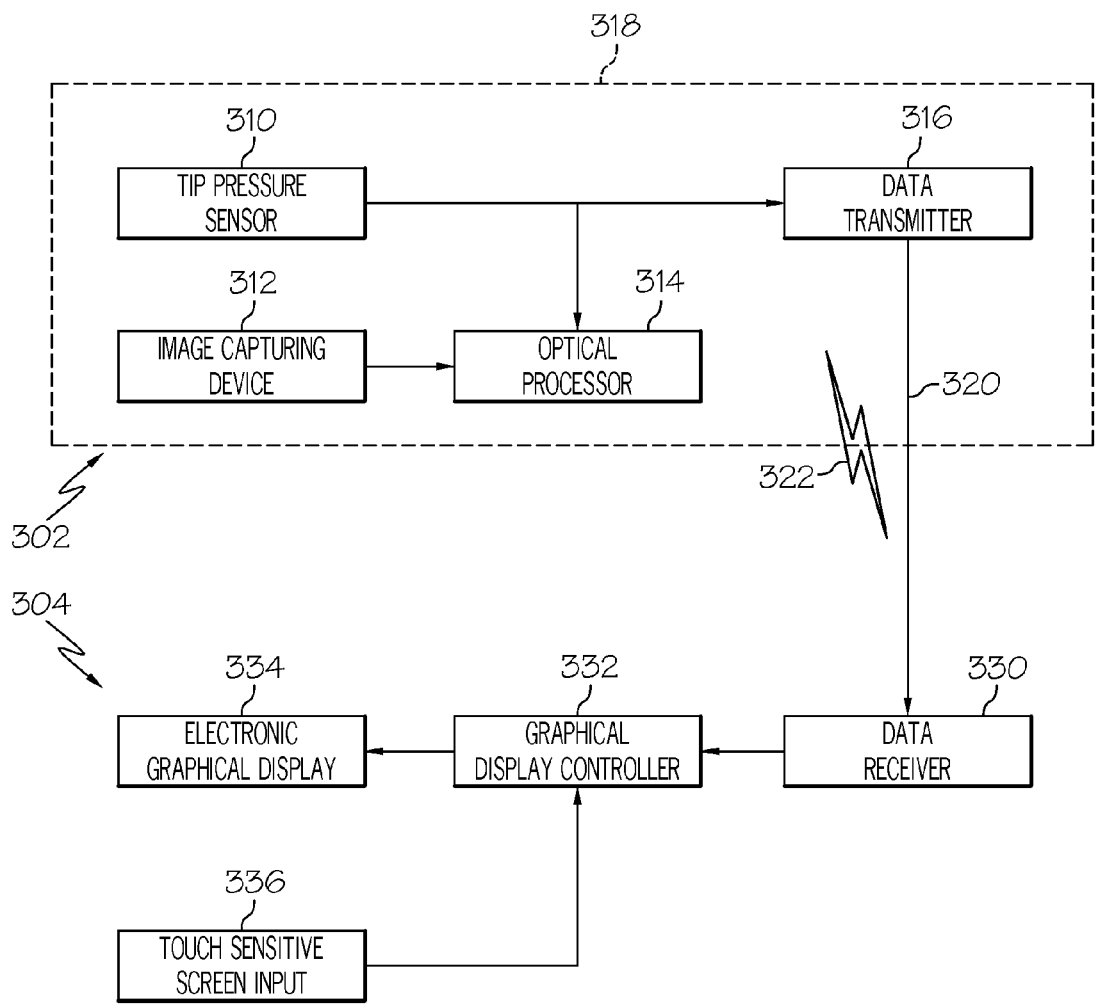
FIG. 3 illustrates a touch sensitive electronic graphical display, in accordance with one example.

FIG. 3 illustrates a touch sensitive electronic graphical display device 300, in accordance with one example. The touch sensitive electronic graphical display device 300 depicts the components of a tracking pen device 302 and an electronic device 304. The tracking pen device 302 operates with the electronic device to allow a user to use a tracking pen device 302 as a user input device for the electronic device 304. As is discussed in detail below, the electronic device 304 has a graphical display controller 332 that is configured to control operation of an electronic graphical display 334. In various scenarios, the graphical display controller 332 of one example controls the electronic graphical display 334 to present an optical tracking grid on the electronic graphical display.

The tracking pen device 302 is shown to include a number of components housed in a tracking pen body 318. In one example, the tracking pen body 318 has a relatively thin, cylindrical shape similar to a common pen or pencil. This shape allows a user to easily and comfortably hold the tracking pen body 318, and therefore the tracking pen device, in his or her hand for use in drawing or handwriting on a surface.

The tracking pen device 302 includes a tip pressure sensor 310 and an image capturing device 312. An example of a tip pressure sensor and an image capturing device are discussed above with regards to FIG. 2. The image capturing device 312 operates to capture a sequence of images of a tracking grid that appears in front of, for example, a tip opening 204 as is discussed above. In various examples, the image capturing device 312 captures images of that surface within the sequence of images at a rate of several times per second. Some examples operate by capturing images within the sequence of images at faster rates, and other examples capture images at slower rates. In general, the capturing of images by the image capturing device 312 is able to be separated by time intervals that allow determination of the movement of the tracking pen body with respect to the surface in front of the tip opening 204. In some examples, the interval between image capture is able to be adjusted based upon detected speed of movements of the tracking pen body 318. For example, a tracking pen body 318 is able to include a gyroscope or other dynamic movement measurement device to estimate a speed of the tracking pen body 318, and the interval between capturing images in the sequence of images is able to be decreased as faster movements are measured.

The tip pressure sensor 310 and the image capturing device 312 provide information to an optical processor 314. In various examples, the optical processor 314 receives the sequence of images and determines changes between or among the images (or the sequence of images). These determinations of changes are able to be made by, for example, performing spatial correlations between captured images to identify a spatial offset between two images. In some examples the changes among two or more images are determined by, for example, image processing techniques to determine translation, rotation, or other changes of image features that are present in two or more of the captured images. Determining changes among images is also able to be performed by any other technique. The optical processor 314 in one example then determines, based on those determined changes, a movement of the tracking pen body. Determining movement of a portion of the tracking pen body is able to be based upon, for example, a magnitude and direction of determined translations or other movements of features between two or more captured images.

The optical processor in one example then determines a data set that characterizes the movement of the pen body based upon the determined movement. The types of characterizations represented by the data set are discussed above and include movement vector data, a time sequence of location points for the pen tip, or other representations. In further examples, the optical processor is able to perform handwriting analysis on the movement data and determine a data set that represents text characters, such as in an eight bit standard known as ASCII, that have been detected by that handwriting analysis.

The optical processor 314 further receives an input from the tip pressure sensor 310. The optical processor 314 in one example only processes captured image data when the tip pressure sensor detects pressure being applied to the tip of the tracking pen body. In various examples, the image capturing device 312 is only operated when the tip pressure sensor 310 detect pressure being applied.

Once the optical processor 314 determines a data set representing the movement of the tracking pen body, the data set is sent to a graphical display controller 332 contained in the electronic device 304, as is discussed in detail below. In one example, sending the data set to the graphical display controller 332 in the electronic device 304 is performed by the optical processor 314 sending the data set to a data transmitter 316. The data transmitter 316 communicates data to the electronic device through an available communications link. In various examples, the available communications link is able to be one or more of a wireless data link 322 and a wired data link 320. Examples of a wireless data link 322 include short range wireless data links such as data links conforming to a Bluetooth® or similar standard. Examples of wired data links 320 include data links that conform to a Universal Serial Bus (USB) or similar standard. These example data links are provided for illustration and any suitable data link is able to be used to communicate data between the tracking pen device 302 and the electronic device 304.

The tip pressure sensor 310 also provides an input to the data transmitter 316 that indicates a determination that the tip pressure sensor 310 detects pressure being applied to a tip of the tracking pen body 318. In response to receiving that input, the data transmitter is configured to send one or more signals to the graphical display controller 332 contained in the electronic device 304. One signal sent by the data transmitter 316 is a grid enable signal, which is sent in response to a detection, by the tip pressure sensor 310, of pressure being applied to a tip of the tracking pen body 318. The grid enable signal, when received by the graphical display controller 332, causes the graphical display controller to initiate a display of an optical tracking grid on the electronic graphical display 334. Initiating a display of an optical tracking grid can include actually displaying an optical tracking grid over the entirety of an electronic graphical display, displaying a portion of an optical tracking grid on the electronic graphical display, displaying an optical tracking grid in a particular field or area or region on the electronic graphical display, or any combination of these. For purposes of the following discussion, initiating a display of a grid and displaying the grid may be deemed to be substantially equivalent.

Some electronic devices 304 have a touch sensitive screen input 336. The touch sensitive screen input 336 is generally integrated into the electronic graphical display 334. The touch sensitive screen input 336 responds to user's touching a display portion of the electronic graphical display 334 by, for example, selecting an icon that is at the location of contact. In examples of tracking pen devices 302 that operate with electronic devices 304 that have a touch sensitive input screen 336, the data transmitter 316 is also configured to send a touch sensitive screen input disable signal under certain conditions. The touch sensitive screen input disable signal is sent in one example in response to a detection, by the tip pressure sensor 310, of pressure being applied to a tip of the tracking pen body 318. In another example, the touch sensitive screen input disable signal is sent in response to a detection of an optical tracking grid by an optical sensor of the tracking pen device 302.

The touch sensitive screen input disable signal, when received by the graphical display controller 332, causes the graphical display controller to disable the touch sensitive screen input 336. In this scenario, the user's pressing down on the tracking pen device 302 indicates that the user is using the tracking pen device 302 for input, and that touch inputs to the touch sensitive screen input 336 should be ignored. Disabling the touch sensitive screen input 336 obviates false inputs being caused by a user's pressing the touch sensitive screen input while inputting data with the tracking pen device 302. This scenario is particularly effective when the user is writing on the electronic graphical display 334 and the user is likely to inadvertent touch the touch sensitive screen input 336 while writing.

The electronic device 304 has a data receiver 330 that receives data that is sent from the tracking pen device 302. In one example, the data receiver 330 implements one or more of the above described wired data links 320 and wireless data links 322 with the data transmitter 316 of the tracking pen device 302. The data receiver 330 provides data received from the tracking pen device to the graphical display controller 332. Data received from the tracking pen device 302 includes a graph enable signal and data sets that characterize pen body movements made by the tracking pen device 302.

The electronic device 304 includes an electronic graphical display 334 that is controlled by the graphical display controller 332. In various scenarios, the graphical display controller 332 causes the electronic graphical display 334 to present an optical tracking grid. The graphical display controller 332 further controls the electronic graphical display 334 to present, for example, one or more of graphical data, textual data, or combinations thereof. As is described below, the graphical display controller 332 receives a data set characterizing the movement of the tracking pen body 318, and is configured to display, on the electronic graphical display 334 in response to reception of that data set, a representation of the movement of the tracking pen body 318. In one example, the representation of the movement of the tracking pen body 318 is a tracing of the path of the pen tip of the tracking pen body 318. In other examples, the representation of the movement of the tracking pen body 318 may be broken line that indicates the movement, or a change in color on the display that corresponds to the movement, or a different contrast, or a visual arrow, or another representation of movement that can be displayed on the graphical display.

As described above, the example electronic devices 304 has a touch sensitive screen input 336. The touch sensitive screen input 336 in this example consists of touch sensors that are integrated into the electronic graphical display 334. The touch sensitive screen input 336 responds to user's touching a display portion of the electronic graphical display 334 by, for example, selecting an icon that is at the location of contact. In examples of tracking pen devices 302 that operate with electronic devices 304 that have a touch sensitive input screen 336, the data transmitter 316 is also configured to send a touch sensitive screen input disable signal under certain conditions. The touch sensitive screen input disable signal is sent in one example in response to a detection, by the tip pressure sensor 310, of pressure being applied to a tip of the tracking pen body 318. The touch sensitive screen input disable signal is also able to be sent in one example in response to a detection, by the optical processor 314, of an optical tracking grid in the images detected by the image capturing device 312. The touch sensitive screen input disable signal, when received by the graphical display controller 332, causes the graphical display controller to disable the touch sensitive screen input 336. In this scenario, the user's pressing down on the tracking pen device 302 indicates that the user is using the tracking pen device 302 for input, and that touch inputs to the touch sensitive screen input 336 should be ignored. Disabling the touch sensitive screen input 336 obviates false inputs being caused by a user's pressing the touch sensitive screen input while inputting data with the tracking pen device 302. This scenario is particularly effective when the user is writing on the electronic graphical display 334 and the user is likely to inadvertent touch the touch sensitive screen input 336 while writing.

Figure 4:
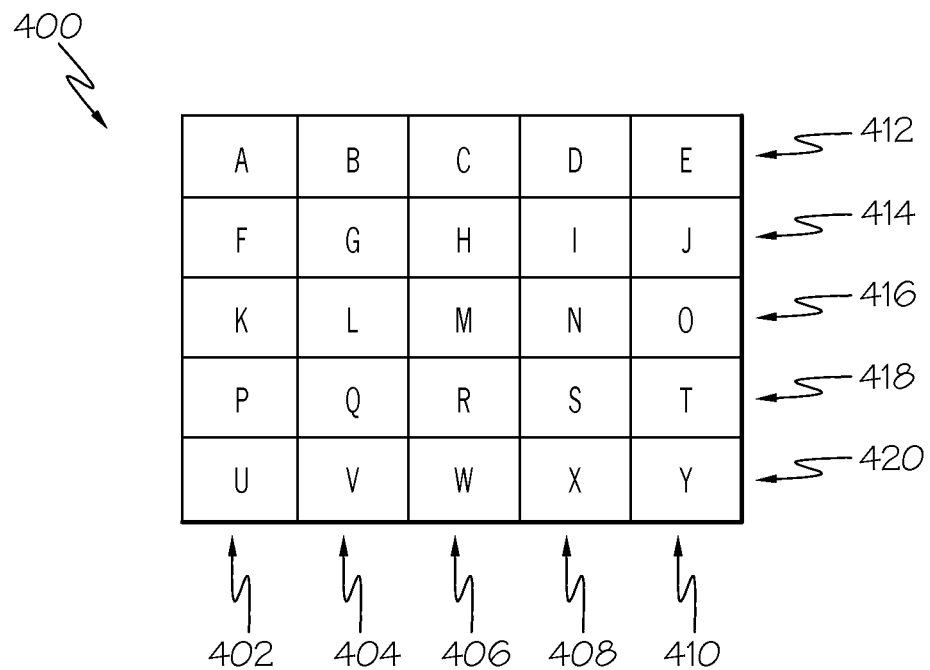
FIG. 4 illustrates an encoded dot field definition, according to one example.

FIG. 4 illustrates an encoded dot field definition 400, according to one example. The encoded dot field definition 400 is an example of a field definition for a dot pattern that is located at one node of an optical tracking grid. With reference to the above description of FIG. 1, the display screen 104 is depicted to show an optical tracking grid 110 in what appears to be an array of points. In one example, each point presented in the optical tracking grid 110 of FIG. 1 is actually a set of dots that have positions defined by the encoded dot field definition 400.

The encoded dot field definition 400 depicts an array of locations that has five columns and five rows. The encoded dot field definition 400 depicted in FIG. 4 therefore contains a total of twenty-five possible locations. The five columns are indicated as a first column 402, a second column 404, a third column 406, a fourth column 408, and a fifth column 410. The five rows are indicated as a first row 412, a second row 414, a third row 416, a fourth row 418, and a fifth row 420. Each location in the array of locations is indicated by a letter "A" through "Y." For example, the location at the intersection of the second column 404 and third row 416 is indicated as location "L."

In one example, each point located in the optical tracking grid 110 is associated with a particular location that is encoded with dots that are placed in a subset of the twenty-five possible locations defined by the encoded dot field definition 400. In practice, each point in the optical tracking grid 110 has one or more dots, with those one or more dots located at various locations depending upon the location of the point in the optical tracking grid 110. In one example, each respective encoded dot field in the plurality of encoded dot fields has a particular configuration that is associated with a location of the respective encoded dot field on the optical tracking grid. An optical sensor located in a tracking pen device is thereby able to identify the location of the tracking pen device by identifying the locations of dots within a point captured by an image capturing device, and correlating that pattern of dots, based on the encoded dot field definition 400, to a location in the optical tracking grid.

Figure 5:
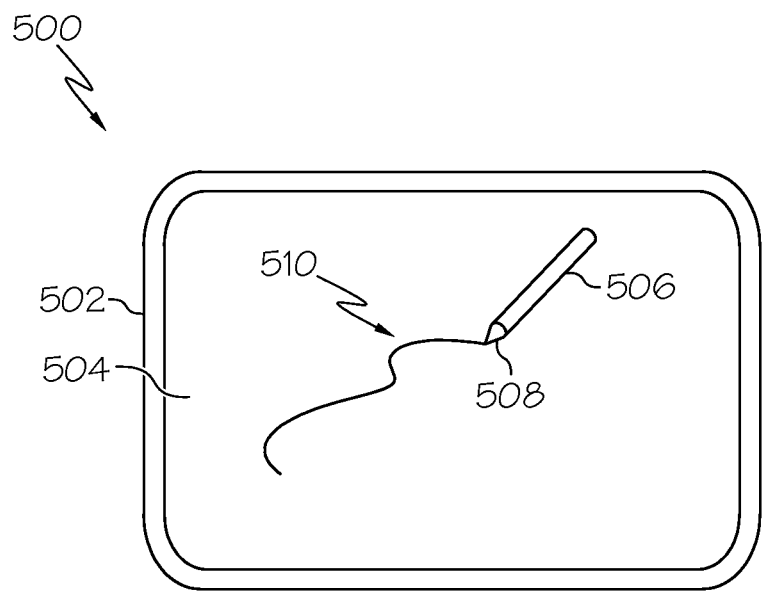
FIG. 5 illustrates a movement tracking electronic graphical display, according to one example.

FIG. 5 illustrates a movement tracking electronic graphical display 500, according to one example. The movement tracking electronic graphical display 500 depicts an electronic device 502 with an electronic graphical display 504. A tracking pen device 506 with a pen tip 508 is shown as having traced a curve 510 along the surface of the electronic graphical display 504.

In operation, the electronic graphical display 504 is displaying an optical tracking grid (not discernible in this figure) that allows the tracking pen device 506 to determine its movement along the surface of the electronic graphical display. An optical processor within the tracking pen device 506 determines the movement of the tracking pen device and determines a data set that characterizes those movements. That data is communicated to a graphical display controller within the electronic device 502 and, in turn, displays a representation of the curve 510, which is a representation of the movement of the tracking pen device 506 along the surface of the electronic graphical display 504.

Figure 6:
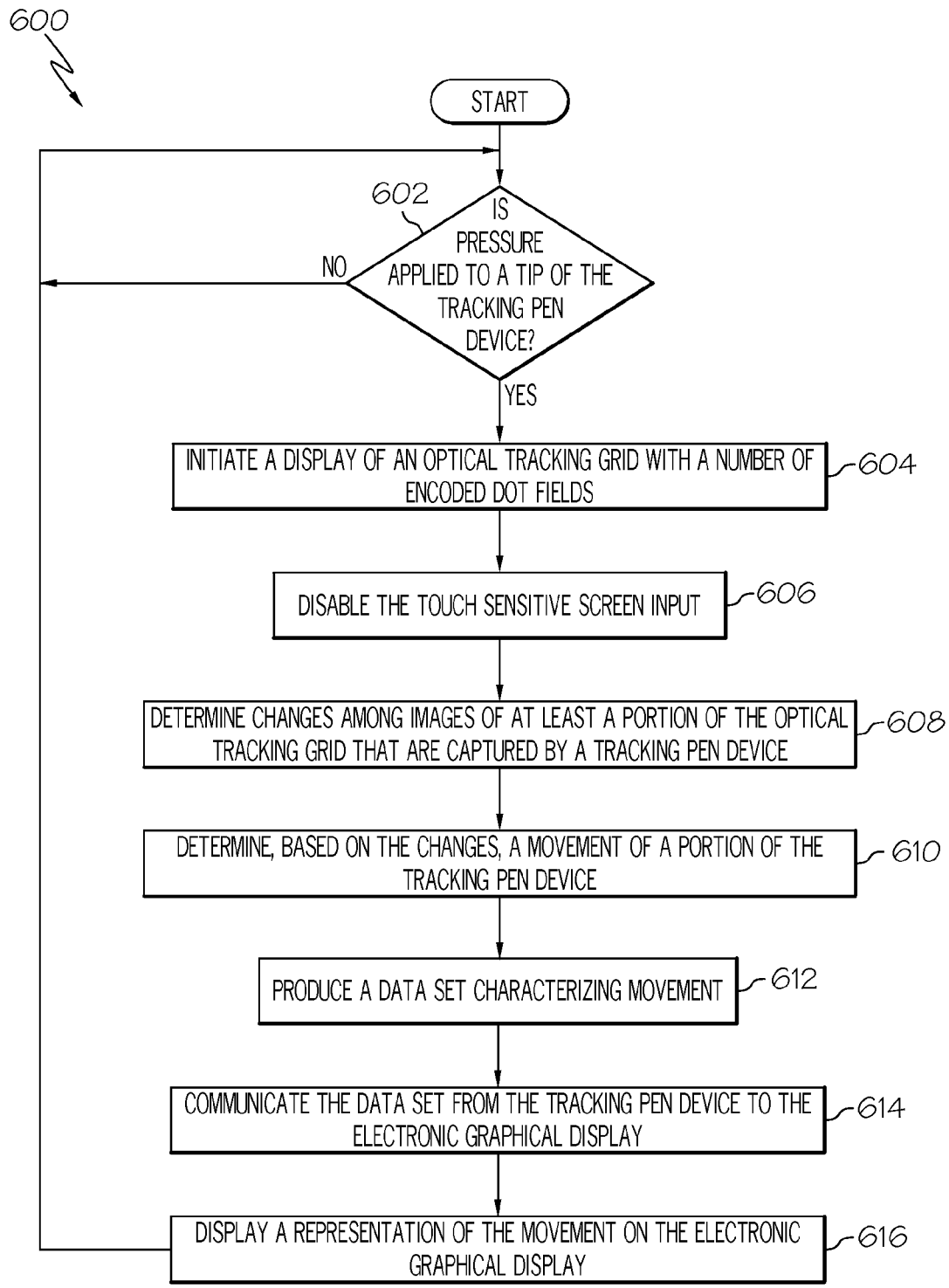
FIG. 6 illustrates a pen input device process, in accordance with one example.

FIG. 6 illustrates a pen input device process 600, in accordance with one example. The pen input device process 600 is an example of a process that operates on processors within the touch sensitive electronic graphical display device 300. The pen input device process 600 is an example of a process that allows a user to use a tracking pen device with a touch sensitive screen input, such as the touch sensitive screen input 336 discussed above. In this example, the tracking pen device has a pressure sensor that detects pressure applied to the point of the tracking pen device, as is also discussed above. Using the example system described above with regards to FIG. 3, the pen input device process 600 responds to a detection of pressure by the tip pressure sensor 310 by displaying an optical tracking grid on the electronic graphical display 334 and disabling the touch sensitive screen input 336.

In particular, the pen input device process 600 begins by determining, at 602, if pressure is applied to a tip of the tracking pen device. If it is determined that pressure has not been applied, the process continues in that determination until it is determined that pressure is applied to the tip of the tracking pen device. When it is determined that pressure is applied to the tip of the tracking pen device, the pen input device process 600 continues by initiating, at 604, a display of an optical tracking grid with a number of encoded dot fields. In one example, the display is on an electronic graphical display. In response to a determination that pressure is applied to the tip of the tracking pen device, a processor within the electronic device disables, at 606, the touch sensitive screen input and determines, at 608, changes among images of at least a portion of the optical tracking grid that are captured by the tracking pen device.

Based upon the determined changes, a determination is made, at 610, of a movement of a portion of the tracking pen device. In one example, the portion of the tracking pen device whose movement is determined corresponds to the tip of the tracking pen device that is in contact with the surface of the electronic display. The pen input device process 600 continues by producing, at 612, a data set characterizing movement. The data set is then communicated, at 614, from the tracking pen device to the electronic graphical display. A representation of the movement on the electronic graphical display is then displayed, at 616. In one example, the representation is displayed on an electronic graphical display.

Figure 7:
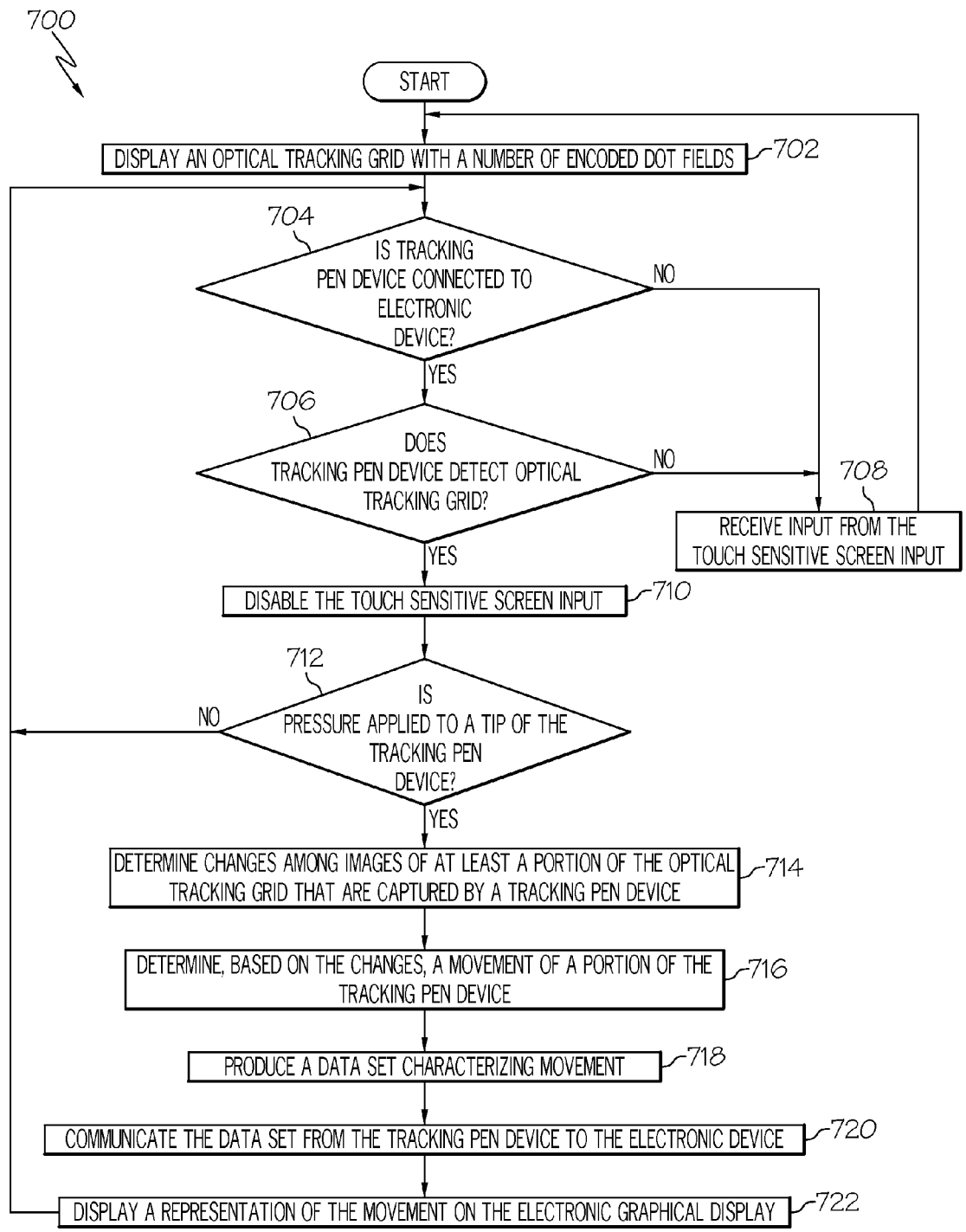
FIG. 7 illustrates an alternative pen input device process, in accordance with one example.

FIG. 7 illustrates an alternative pen input device process 700, in accordance with one example. The alternative pen input device process 700 is an alternative example of a process that operates on processors within the touch sensitive electronic graphical display device 300. The alternative pen input device process 700 allows a user to input data by either using a tracking pen device or by directly using a touch screen interface, such as by touching or moving a finger or other object across a surface of the touch screen interface. Using the system described above with regards to FIG. 3, the alternative pen input device process 700 continuously displays an optical tracking grid on the electronic graphical display 334. When a tracking pen device 302 device is not connected to the electronic device 304 or if the image capturing device 312 of the tracking pen device 302 does not detect an optical tracking grid, the electronic device 304 accepts user input from the touch sensitive input screen 336. When a tracking pen device 302 device is connected to the electronic device 304 and the image capturing device 312 of the tracking pen device 302 detects an optical tracking grid, the electronic device 304 receives user input by use of the tracking pen device 302.

The alternative pen input device process 700 begins by displaying, or initiating the display of, at 702, an optical tracking grid with a number of encoded dot fields. In one example, the optical tracking grid is displayed on the electronic graphical display 334 of the electronic device 304. The alternative pen input device process 700 continues by determining, at 704, if a tracking pen device is connected to the electronic device. If a tracking pen device is determined to be connected to the electronic device, the alternative pen input device process 700 determines, at 706, if the tracking pen device detects an optical tracking grid.

If a tracking pen device is not determined to be connected to the electronic device, or if a tracking pen device is connected but does not detect an optical tracking grid, the alternative pen input device process 700 receives, at 708, input from a touch sensitive screen input. The alternative pen input device process 700 returns to displaying, at 702, the optical tracking grid and performing the above described determinations.

Returning to the determination, at 706, of whether the tracking pen device detects an optical tracking grid, if this determination is true, the alternative pen input device process 700 continues by disabling, at 710, the touch sensitive screen input. The touch sensitive screen input is disabled in one example to preclude unintentional input when writing on the electrical graphical display by, for example, touching such as by resting ones palm on the touch sensitive screen input.

The alternative pen input device process 700 continues by determining, at 712, if pressure is applied to a tip of the tracking pen device. If it is determined that pressure has not been applied, the alternative pen input device process 700 returns to determining, at 704, if a tracking pen device is connected to the electronic device, and performing the above described processing. In response to a determination that pressure is applied to the tip of the tracking pen device, the alternative pen input device process 700 continues by determining, at 714, changes among images of at least a portion of the optical tracking grid that are captured by the tracking pen device.

Based upon the determined changes, a determination is made, at 716, of a movement of a portion of the tracking pen device. In one example, the portion of the tracking pen device whose movement is determined corresponds to the tip of the tracking pen device that is in contact with the surface of the electronic display. The alternative pen input device process 700 continues by producing, at 718, a data set characterizing movement. The data set is then communicated, at 720, from the tracking pen device to the electronic device. A representation of the movement on the electronic graphical display is then displayed, at 722. In one example, the representation is displayed on an electronic graphical display. The alternative pen input device process 700 then returns to determining, at 704, if a tracking pen device is connected to the electronic device.

Figure 8A:
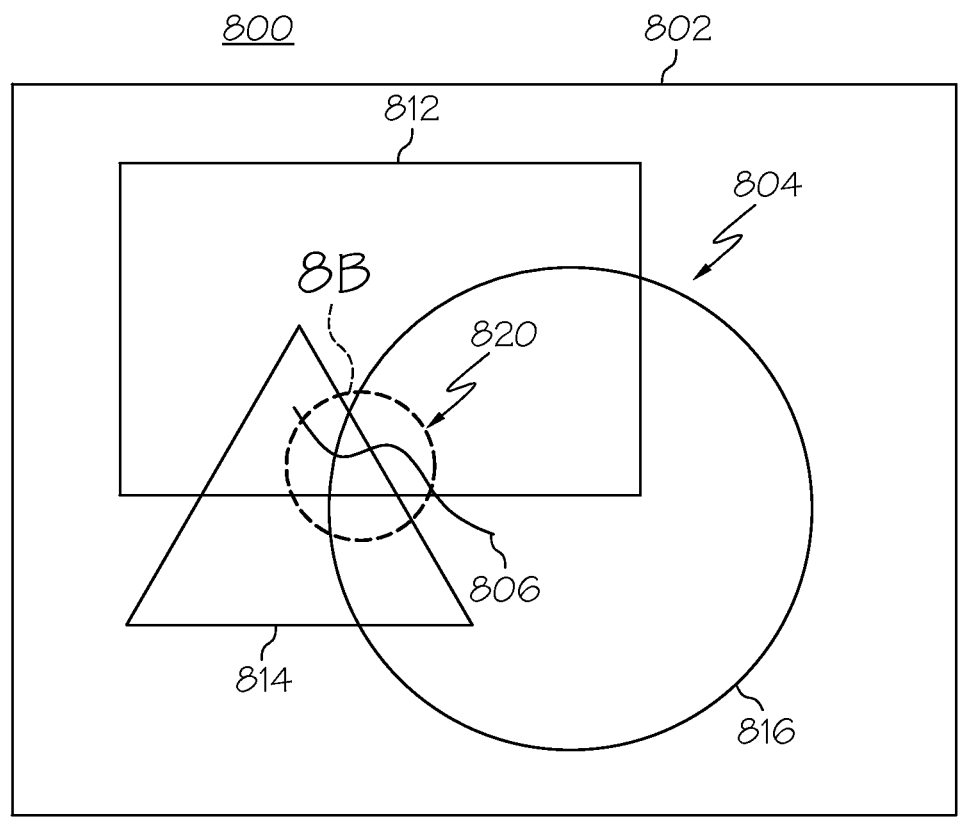
FIGS. 8A and 8B illustrate an image based optical tracking grid display, according to one example.
Figure 8B:
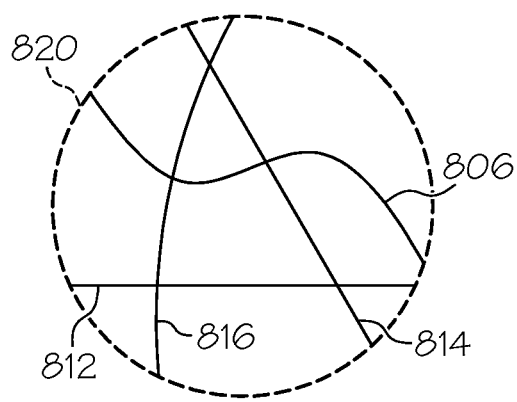

FIGS. 8A and 8B illustrate an image based optical tracking grid display 800, according to one example. The image based optical tracking grid display 800 as is illustrated in FIG. 8A includes an example of an image based optical tracking grid 804 that is displayed on an electronic graphics display 802. The image based optical tracking grid 804 of this example consists of several geometric shapes that are displayed at particular locations of the electronic graphics display 802. The location of these several geometric shapes is selected to facilitate in determining a location of segments of the image based optical tracking grid 804 contained in an captured image of a small portion of the image based optical tracking grid 804. In one example, such an image of a small portion of the image based optical tracking grid is captured by an image capturing device of a tracking pen device. An electronic definition of the image based optical tracking grid 804 is able to be stored in, or accessible to, a tracking pen device or other processor that processes images captured by a tracking pen device. Portions of the image based optical tracking grid 804 that are captured by, for example, an image capturing device in the tip of a tracking pen device are able to be compared to the definition of the image based optical tracking grid 804 to determine movements of the tip of the tracking pen device.

The image based optical tracking grid display 800 of this example presents, on an electronic graphical display 802, an image based optical tracking grid 804 that has three geometric shapes, a rectangle 812, a triangle 814 and a circle 816. These three shapes are displayed at certain positions on the electronic graphics display that allows a tracking pen device, for example, to capture small portions of the image based optical tracking grid 804 and correlate that captured image with a unique location of the image based tracking grid 804. The pen tip location processing in one example is able to be simplified by tracking the movement of the uniquely shaped line segments of the image based optical tracking grid 804 that are within the captured portions of the geometric shapes as the pen tip is incrementally moved across the surface of the electronic graphical display 802.

The image based optical tracking grid display 800 depicts a drawn curve 806 that is a curve drawn by a user with a tracking pen device. The drawn curve 806 of this example is similar to the curve 510 discussed above with regards to the movement tracking electronic graphical display 500. The image based optical tracking grid display 800 further depicts a captured portion 820 of the image based tracking grid 804. The captured portion 820 is an example of a portion the image based tracking grid 804 that is captured by an image capturing device within a tip of a tracking pen device.

The captured portion 820 as illustrated in FIG. 8B includes a portion of the rectangle 812, a portion of the triangle 814, and a portion of the circle 816. The characteristics of the portions of these geometric shapes, e.g., their curvature (or lack thereof), angular relationships, etc., that are present in the lines and curves within the captured portion 820 allow a processor to identify the location of the capture portion 820 within the entire image based optical tracking grid 804. A portion of the drawn curve 806 is also present in the captured portion. In one example, characterizations of curves that were drawn by a user and that are presented on the electronic graphics display 802 are retained and are able to be used in processing captured images. Information describing the location of previously drawn curves is able to be used to, for example, either exclude captured portions of those drawn curves, or the processing is able to incorporate known location of those drawn curves aid in determining the location of a captured image within the image based optical tracking grid.

As a tracking pen device moves along the surface of the electronic graphics display 802, an image capturing device in the tip of the tracking pen device captures different portions of the image based optical tracking grid 804. Determining movements of line segments within the captured portion of the image based tracking grid 804 allows determination of incremental movement of the tip of the tracking pen device, and correlation of those segments to a particular portion of the entire image based optical tracking grid 804 allows determination of the location of the tip of the tracking pen device on the electronic graphics display 802.

Figure 9:
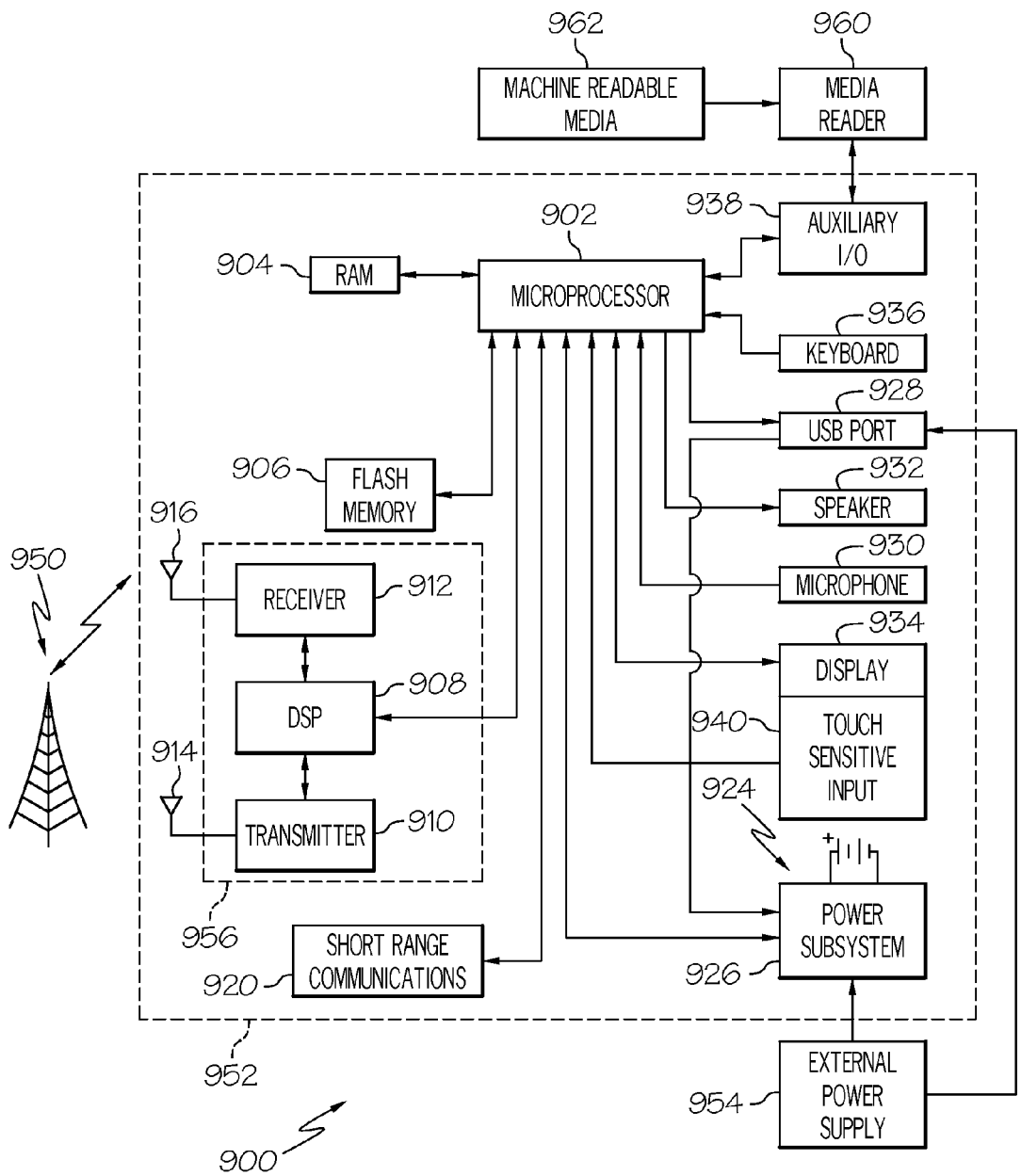
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. In this example, an electronic device 952 is a wireless two-way communication device with voice and data communication capabilities, such as the example electronic device 92. Such electronic devices communicate with a wireless voice or data network 950 using a suitable wireless communications protocol. Wireless voice communications are performed using either an analog or digital wireless communication channel. Data communications allow the electronic device 952 to communicate with other computer systems via the Internet. Examples of electronic devices that are able to incorporate the above described systems and methods include, for example, a data messaging device, a two-way pager, a cellular telephone or smart phone with data messaging capabilities, a wireless Internet appliance, a laptop computer, a tablet computing device, a navigation device or a data communication device that may or may not include telephony capabilities. Some of these devices may be handheld, that is, sized and shaped to be held or carried in a human hand, and that may be used when held.

The illustrated electronic device 952 is an example electronic device that includes two-way wireless communications functions. Such electronic devices incorporate a communication subsystem 956 that includes elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem 956 is dependent upon the communication network and associated wireless communications protocols with which the device is intended to operate.

The electronic device 952 includes a microprocessor 902 that controls the overall operation of the electronic device 952. The microprocessor 902 interacts with the above described communications subsystem elements and also interacts with other device subsystems such as flash memory 906, random access memory (RAM) 904, auxiliary input/output (I/O) device 938, universal serial bus (USB) Port 928, display 934, touch sensitive input 940, keyboard 936, speaker 932, microphone 930, a short-range communications subsystem 920, a power subsystem and charging controller 926, and any other device subsystems.

Microprocessor 902 in one example receives and processes data sets that correspond to movements of a tracking pen device, as is described above. The microprocessor 902 is able to interpret these data sets according to various techniques, including character recognition, graphical data compression using various techniques, and the like. Based upon interpretation of the indication data and their associated drawing gestures, the microprocessor 902 is able to extract display representations corresponding to those movements on display 934. In one example, display 934 further includes a touch sensitive input 940, allowing the use of display 934 as a touch screen input. Based on signals received from the tracking pen device, the touch sensitive input 940 is able to be disabled, as is discussed above.

A power pack 924 is connected to a power subsystem and charging controller 926 as is described in detail above. The power pack 924 provides power to the circuits of the electronic device 952. The power subsystem and charging controller 926 includes power distribution circuitry for providing power to the electronic device 952 and also contains power pack charging controller circuitry to manage recharging the power pack 924. The power subsystem and charging controller 926 receives power from an external power supply 954 that is connected through a power connector of the electronic device 952 or through the USB port 928.

The USB port 928 provides data communication between the electronic device 952 and one or more external devices. Data communication through USB port 928 enables a user to set preferences through the external device or through a software application and extends the capabilities of the device by enabling information or software exchange through direct connections between the electronic device 952 and external data sources rather than through a wireless data communication network. In one example, the USB port 928 implements a wired communications link to a wired tracking pen device 122, such as through the wired data link 132 between the wired tracking pen device 122 and electronic device 102 as is described with regards to FIG. 1.

Operating system software used by the microprocessor 902 is stored in flash memory 906. Further examples are able to use a power pack backed-up RAM or other non-volatile storage data elements to store operating systems, other executable programs, or both. The operating system software, device application software, or parts thereof, are able to be temporarily loaded into volatile data storage such as RAM 904. Data received via wireless communication signals or through wired communications are also able to be stored to RAM 904.

The microprocessor 902, in addition to its operating system functions, is able to execute software applications on the electronic device 952. A predetermined set of applications that control basic device operations, including at least data and voice communication applications, is able to be installed on the electronic device 952 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 952 through, for example, the wireless network 950, an auxiliary I/O device 938, USB port 928, short-range communications subsystem 920, or any combination of these interfaces. Such applications are then able to be installed by a user in the RAM 904 or a non-volatile store for execution by the microprocessor 902.

In a data communication mode, a received signal such as a text message or web page download is processed by the communication subsystem, including wireless receiver 912 and wireless transmitter 910, and communicated data is provided the microprocessor 902, which is able to further process the received data for output to the display 934, or alternatively, to an auxiliary I/O device 938 or the USB port 928. A user of the electronic device 952 may also compose data items, such as e-mail messages, using the keyboard 936, which is able to include a complete alphanumeric keyboard or a telephone-type keypad, in conjunction with the display 934 and possibly an auxiliary I/O device 938. A user is also able to compose items through the use of, for example, a tracking pen device 120 as is discussed above with regards to FIG. 1. Such composed items are then able to be transmitted over a communication network through the communication subsystem.

For voice communications, overall operation of the electronic device 952 is substantially similar, except that received signals are generally provided to a speaker 932 and signals for transmission are generally produced by a microphone 930. Alternative voice or audio I/O subsystems, such as a voice message recording subsystem, may also be implemented on the electronic device 952. Although voice or audio signal output is generally accomplished primarily through the speaker 932, the display 934 may also be used to provide an indication of the identity of a calling party, the duration of a voice call, or other voice call related information, for example.

Depending on conditions or statuses of the electronic device 952, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 920 is a further optional component which may provide for communication between the electronic device 952 and different systems or devices, which need not necessarily be similar devices. For example, the short-range communications subsystem 920 may include an infrared device and associated circuits and components or a Radio Frequency based communication module such as one supporting Bluetooth® communications, to provide for communication with similarly-enabled systems and devices. In one example, the short range communications system 920 implements a wireless communications link to a wireless tracking pen device 120, such as through the wireless data link 130 between the wireless tracking pen device 120 and electronic device 102 as is described with regards to FIG. 1.

A media reader 960 is able to be connected to an auxiliary I/O device 938 to allow, for example, loading computer readable program code of a computer program product into the electronic device 952 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. Media reader 960 is alternatively able to be connected to the electronic device through the USB port 928 or computer readable program code is alternatively able to be provided to the electronic device 952 through the wireless network 950.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of obtaining user input, the method comprising:
    initiating a display of an optical tracking grid on an electronic graphical display, wherein the electronic graphical display comprises a touch sensitive screen input;
    detecting the optical tracking grid within a plurality of images of at least a portion of the optical tracking grid that are captured by a tracking pen device;
    disabling, based on the detecting the optical tracking grid, the touch sensitive screen input;
    determine changes among the plurality of images;
    determining, based on the changes, a movement of a portion of the tracking pen device; and
    producing, in response to determining the movement, a data set characterizing movement.

2. The method of claim 1, the method further comprising:
    displaying on the electronic graphical display, in response to producing the data set, a representation of the movement.

3. The method of claim 1, further comprising communicating, in response to producing the data set, the data set from the tracking pen device to a controller of the electronic graphical display.

4. The method of claim 1, wherein the optical tracking grid comprises a plurality of encoded dot fields, each respective encoded dot field in the plurality of encoded dot fields having a particular configuration that is associated with a location of the respective encoded dot field on the optical tracking grid.

5. The method of claim 1, further comprising:
    detecting pressure being applied to a tip of the tracking pen device, and
    wherein at least one of the determining changes among images, determining a movement, and the producing the data set is performed in further response to the detecting pressure being applied.

6. The method of claim 1, further comprising:
    detecting pressure being applied to a tip of the tracking pen device, and wherein the initiating the display of the optical tracking grid is in response to the detecting pressure being applied.

7. The method of claim 6, the method further comprising: disabling, in response to the detecting pressure being applied, the touch sensitive screen input.

8. The method of claim 1,
wherein the optical tracking grid comprises a plurality of geometric shapes, the plurality of geometric shapes having an arrangement relative to one another in the optical tracking grid, each geometric shape in the plurality of geometric shapes having a respective size,
wherein the images of at least a portion of the optical tracking grid comprise a plurality of captured images, each respective captured image capturing a respective portion of the optical tracking grid that is smaller than a respective size of at least one of the plurality of geometric shapes, and
wherein determining the movement further comprises determining, based upon the arrangement of the plurality of the geometric shapes within the optical tracking grid, a respective location of each respective portion of the optical tracking grid captured by each respective captured image.

9. The method of claim 8, wherein the display further presents an indication of prior locations on the display of the portion of the optical tracking pen,
wherein at least a subset of the captured images further capture the indication of prior locations,
wherein the determining the movement is further based upon the indication of prior locations captured within the at least the subset of the captured images.

10. The method of claim 8, wherein determining the location of the respective portion of the optical tracking grid captured in each respective captured image is based upon characteristics of portions of the geometric shapes captured within the respective portion.

11. A tracking pen device, comprising:
a tracking pen body;
a data transmitter configured to:
send a grid enable signal to an electronic graphical display to initiate a display of an optical tracking grid thereon, wherein the electronic graphical display comprises a touch sensitive screen input; and
send a touch sensitive screen input disable signal to the electronic graphical display to disable the touch sensitive screen input;
an image capturing device, fixedly mounted to the tracking pen body, the image capturing device configured to capture a sequence of images of at least a portion of the optical tracking grid relative to the tracking pen body;
an optical processor configured to:
detect, within the images, the optical tracking grid;
determine changes among the sequence of images;
determine, based on the changes, a movement of the tracking pen body; and
determine, in response to determining the movement, a data set characterizing movement, and
wherein the data transmitter is further configured to send the touch sensitive screen input disable signal in response to a detection of the optical tracking grid within the images.

12. The tracking pen device of claim 11, the data transmitter further configured to communicate, in response to a determination of the data set, the data set to a controller of the electronic graphical display.

13. The tracking pen device of claim 11, wherein the optical tracking grid comprises a plurality of encoded dot fields, each respective encoded dot field in the plurality of encoded dot fields having a particular configuration that is associated with a location of the respective encoded dot field on the optical tracking grid,
wherein the optical processor is further configured to determine a location of the tracking pen body relative to the optical tracking grid by identifying at least one encoded dot field, and
wherein the optical processor is configured to determine the movement based at least in part on the location.

14. The tracking pen device of claim 11, further comprising:
a tip pressure sensor configured to detect pressure being applied to a tip of the tracking pen device, and
wherein the optical processor is configured to determine at least one of changes among the images, the movement, and the data set, in response to a detection of the pressure being applied by the tip pressure sensor.

15. The tracking pen device of claim 11, further comprising:
a tip pressure sensor configured to detect pressure being applied to a tip of the tracking pen device, and
wherein the data transmitter is configured to send the grid enable signal in response to a detection of the pressure being applied by the tip pressure sensor.

16. The tracking pen device of claim 15,
wherein the data transmitter is further configured to send, in response to a detection of the pressure being applied by the tip pressure sensor, a touch sensitive screen input disable signal to the electronic graphics display to disable the touch sensitive screen input.

17. The tracking pen device of claim 11,
wherein the optical tracking grid comprises an arrangement of a plurality of geometric shapes, each geometric shape within the arrangement of the plurality of geometric shapes being displayed at a respective particular location on the electronic graphical display, each geometric shape in the plurality of geometric shapes having a respective size,
wherein the sequence of images comprises a plurality of captured images, each captured image capturing a respective portion of the optical tracking grid that is smaller than a respective size of at least one of the plurality of geometric shapes, and
wherein determining the movement further comprises determining, based upon the arrangement of the plurality of the geometric shapes within the optical tracking grid, a respective portion of the optical tracking grid captured by each captured image, the respective portion.

18. A touch sensitive electronic graphical display, comprising:
a display body;
an electronic graphical display physically coupled to the display body the electronic graphical display further comprising a touch sensitive screen input;
a graphical display controller configured to control operation of the electronic graphical display;
a tracking pen body movable relative to the display body;
a data transmitter physically coupled to the tracking pen body, the data transmitter configured to:
send a grid enable signal to the graphical display controller to initiate a display of an optical tracking grid on the electronic graphical display;
an image capturing device, fixedly mounted to the tracking pen body, the image capturing device configured to capture a sequence of images of at least a portion of the optical tracking grid relative to the tracking pen body;

an optical processor, communicatively coupled to the graphical display controller, the optical processor configured to:

detect, within the images, the optical tracking grid;

determine changes among the sequence of images;

determine, based on the changes, a movement of the tracking pen body;

determine, in response to determining the movement, a data set characterizing movement; and send the data set to the graphical display controller, and wherein the data transmitter is further configured to send, in response to a detection of the optical tracking grid, the touch sensitive screen input disable signal.

19. The touch sensitive electronic graphical display of claim 18, wherein the optical tracking grid comprises a plurality of encoded dot fields, each respective encoded dot field in the plurality of encoded dot fields having a particular configuration that is associated with a location of the respective encoded dot field on the optical tracking grid, wherein the optical processor is further configured to determine a location of the tracking pen body relative to the optical tracking grid by identifying at least one encoded dot field, and wherein the optical processor is configured to determine the movement based at least in part on the location.

20. The touch sensitive electronic graphical display of claim 18, further comprising:

a tip pressure sensor, coupled to the tracking pen body, the tip pressure sensor configured to detect pressure being applied to a tip of the tracking pen body, and wherein the optical processor is configured to determine at least one of changes among the images, the movement, and the data set, in response to a detection of the pressure being applied by the tip pressure sensor.

21. The touch sensitive electronic graphical display of claim 18, further comprising:

a tip pressure sensor, coupled to the tracking pen body, the tip pressure sensor configured to detect pressure being applied to a tip of the tracking pen body, and wherein the data transmitter is configured to send the grid enable signal in response to a detection of the pressure being applied by the tip pressure sensor.

22. The touch sensitive electronic graphical display of claim 21, wherein the data transmitter is further configured to send, in response to a detection of the pressure being applied by the tip pressure sensor, a touch sensitive screen input disable signal to the graphical display controller to disable the touch sensitive screen input.

23. A computer readable non-transitory storage medium having computer readable program code embodied therewith, the computer readable program code comprising instructions for:

initiating a display of an optical tracking grid on an electronic graphical display, wherein the electronic graphical display comprises a touch sensitive screen input;

detecting the optical tracking grid within a plurality of images of at least a portion of the optical tracking grid that are captured by a tracking pen device;

disabling, based on the detecting the optical tracking grid, the touch sensitive screen input;

determining changes among the plurality of images;

determining, based on the changes, a movement of a portion of the tracking pen device; and producing, in response to determining the movement, a data set characterizing movement.

24. The computer readable non-transitory storage medium of claim 23, wherein the optical tracking grid comprises a plurality of encoded dot fields, each respective encoded dot field in the plurality of encoded dot fields having a particular configuration that is associated with a location of the respective encoded dot field on the optical tracking grid.

* * * * *